(12) United States Patent
Li et al.

(10) Patent No.: US 11,295,883 B2
(45) Date of Patent: Apr. 5, 2022

(54) ROTARY JOINT ELECTROMAGNETIC LOCKING DEVICE AND ROTARY JOINT

(71) Applicant: Harbin Institute of Technology, Shenzhen, Guangdong (CN)

(72) Inventors: Peng Li, Guangdong (CN); Yantao Shen, Guangdong (CN); Xingguang Duan, Beijing (CN); Yunhui Liu, Guangdong (CN)

(73) Assignee: Harbin Institute of Technology, Shenzhen, Shenzhen (CN)

( * ) Notice: Subject to any disclaimer, the term of this patent is extended or adjusted under 35 U.S.C. 154(b) by 233 days.

(21) Appl. No.: 16/558,295

(22) Filed: Sep. 2, 2019

(65) Prior Publication Data
US 2020/0346343 A1    Nov. 5, 2020

Related U.S. Application Data

(63) Continuation of application No. PCT/CN2019/089323, filed on Apr. 30, 2019.

(51) Int. Cl.
*H01F 7/20*    (2006.01)
*H01F 7/08*    (2006.01)
(Continued)

(52) U.S. Cl.
CPC ............. *H01F 7/081* (2013.01); *F16C 11/10* (2013.01); *H01F 7/14* (2013.01); *H01F 2007/085* (2013.01)

(58) Field of Classification Search
CPC ...... H01F 7/081; H01F 7/14; H01F 2007/085; F16C 11/10; F16C 32/04; F16C 32/0412;
(Continued)

(56) References Cited

U.S. PATENT DOCUMENTS 731,474 A * 6/1903 Pontois .................. F16D 27/12
192/84.21
2,453,957 A * 11/1948 Allen .................... F16D 48/064
192/84.21
(Continued)

FOREIGN PATENT DOCUMENTS

CN    102350705 A    2/2012
CN    202719019 U    2/2013
(Continued)

*Primary Examiner* — Shawki S Ismail
*Assistant Examiner* — Lisa N Homza

(57) ABSTRACT

The present disclosure discloses a rotary joint electromagnetic locking device and a rotary joint, the rotary joint electromagnetic locking device comprising a first electromagnetic sucker, a sliding plate, a rotary plate, a connecting shaft connecting the first electromagnetic sucker and the sliding plate, and a second electromagnetic sucker, different from the prior art. When the first electromagnetic sucker and the second electromagnetic sucker have no adsorption force, the sliding plate and the rotary plate can be locked to each other; when the second electromagnetic sucker has an adsorption force, the rotary plate or the first electromagnetic sucker is adsorbed by the second electromagnetic sucker, making the sliding plate and the rotary plate to be further locked; when the first electromagnetic sucker has an adsorption force, the sliding plate can be adsorbed to the first contact surface of the first electromagnetic sucker, making the sliding plate released from the rotary plate.

10 Claims, 7 Drawing Sheets

(51) Int. Cl.
*F16C 11/10* (2006.01)
*H01F 7/14* (2006.01)

(58) Field of Classification Search
CPC .......................... F16C 32/0474; F16C 11/045; F16C 2322/59; F16C 2202/40; F16C 2226/18; B25J 19/0004
USPC ....................................................... 335/289
See application file for complete search history.

(56) References Cited

U.S. PATENT DOCUMENTS

| | | | | |
|---|---|---|---|---|
| 2,647,601 | A * | 8/1953 | Malick | F16D 27/12 192/84.5 |
| 2,801,719 | A * | 8/1957 | Clerk | F16D 27/12 192/35 |
| 2,807,147 | A * | 9/1957 | Jacobs | B60H 1/3208 62/208 |
| 2,851,865 | A * | 9/1958 | Jacobs | B60H 1/3208 62/213 |
| 2,862,590 | A * | 12/1958 | Schuman | F16D 27/12 192/84.21 |
| 3,053,364 | A * | 9/1962 | Thielmann | F16D 48/064 192/53.2 |
| 3,387,689 | A * | 6/1968 | Ovshinsky | F16D 67/06 192/226 |
| 3,463,020 | A * | 8/1969 | Gelb | F16H 3/145 476/11 |
| 3,463,021 | A * | 8/1969 | Gelb | F16H 3/145 476/11 |
| 3,547,240 | A * | 12/1970 | Holper | F16D 27/06 192/48.2 |
| 4,353,446 | A * | 10/1982 | Wilken | G05D 3/149 192/21 |
| 5,057,728 | A * | 10/1991 | Dammeyer | F16D 65/46 310/77 |
| 5,172,798 | A * | 12/1992 | Mabee | F16D 27/112 188/161 |
| 5,398,792 | A * | 3/1995 | Teraoka | B60K 17/35 180/248 |
| 5,884,738 | A * | 3/1999 | Joslin | F16H 48/295 192/35 |
| 6,013,003 | A * | 1/2000 | Boffelli | F01P 7/046 192/84.21 |
| 6,257,386 | B1 * | 7/2001 | Saito | F16D 27/10 192/37 |
| 7,422,094 | B2 * | 9/2008 | Yokomori | F16D 27/118 192/114 R |
| 8,324,774 | B2 * | 12/2012 | Kitabatake | H02K 7/1025 310/77 |
| 2002/0053496 | A1 * | 5/2002 | Ritter | F01P 7/084 192/48.2 |
| 2006/0213743 | A1 * | 9/2006 | Wolf | F16D 27/12 192/48.2 |
| 2007/0084691 | A1 * | 4/2007 | Boffelli | F01P 7/084 192/48.2 |
| 2010/0133059 | A1 * | 6/2010 | Winkler | F16D 27/12 192/84.21 |

FOREIGN PATENT DOCUMENTS

| | | |
|---|---|---|
| CN | 105715667 A | 6/2016 |
| CN | 208352056 U | 1/2019 |
| EP | 1473473 A1 | 11/2004 |

* cited by examiner

ROTARY JOINT ELECTROMAGNETIC LOCKING DEVICE AND ROTARY JOINT

CROSS-REFERENCE TO RELATED APPLICATIONS

This application is a continuation of International Application No. PCT/CN2019/089323, filed on Apr. 30, 2019, which is hereby incorporated by reference in its entirety.

TECHNICAL FIELD

The present disclosure relates to the technical field of machinery, and in particular to a rotary joint electromagnetic locking device and a rotary joint.

BACKGROUND

The field of robotic automation is rapidly developing. In some applications, it is necessary to have both precise motion and relatively large loads between adjacent motion joints. One method is to use a precision servo reduction motor; and another is to use an electromagnetic locking joint.

However, the inventors of the present application found in the long-term development process that the first method is costly and not suitable for manual operation, and the second method has a large backlash between adjacent moving joints and cannot achieve precise locking and positioning.

SUMMARY

The technical problem to be solved by the present disclosure is to provide a rotary joint electromagnetic locking device and a rotary joint, which can tightly lock two rotary parts, is low in cost and can achieve manual operation.

In order to solve the above technical problem, the technical solution adopted by the present disclosure is to provide a rotary joint electromagnetic locking device, the rotary joint locking device comprising: a first electromagnetic sucker provided with a first contact surface; a sliding plate disposed on the first contact surface of the first electromagnetic sucker, a first locking member being disposed on the sliding plate; a rotary plate corresponding to the sliding plate, the rotary plate being provided with a second locking member at a position corresponding to the first locking member of the sliding plate, the second locking member and the first locking member being-configured for locking each other; a connecting shaft for sequentially connecting the first electromagnetic sucker and the sliding plate, the connecting shaft being configured for sliding the sliding plate in an axial direction of the connecting shaft, when the first locking member of the sliding plate is locked with the second locking member of the rotary plate, the connecting shaft being configured for restricting rotation of the rotary plate; a second electromagnetic sucker disposed with the first electromagnetic sucker in a magnetically isolated way; wherein when neither the first electromagnetic sucker nor the second electromagnetic sucker has an adsorption force, the first locking member on the sliding plate and the second locking member on the rotary plate are locked to each other, when the second electromagnetic sucker has an adsorption force, the rotary plate or the first electromagnetic sucker is adsorbed by the second electromagnetic sucker, so that the first locking member on the sliding plate and the second locking member on the rotary plate are further locked; when the first electromagnetic sucker has an adsorption force, the sliding plate is adsorbed to the first contact surface of the first electromagnetic sucker, so that the first locking member and the second locking member on the rotary plate are unlocked and released.

Wherein the rotary joint locking device comprises a plurality of elastic members, and the plurality of elastic members are spaced apart from each other on the first electromagnetic sucker and each comprises opposite first end and second end, the first end abutting the first electromagnetic sucker, and the second end abutting the sliding plate, when the elastic member is in a natural state, the elastic member protrudes beyond the first contact surface of the first electromagnetic sucker; wherein the first electromagnetic sucker is circumferentially provided with a plurality of threaded holes that are spaced apart, one end of each of the threaded hole being provided with a top thread rotatable along the threaded hole, a part of the elastic member being located within the threaded hole, and the first end of the elastic member abutting the top thread; wherein the connecting shaft is located at a center of the first electromagnetic sucker, the connecting shaft is a spline shaft, the spline shaft is provided with a check ring, and the check ring is located between the sliding plate and the rotary plate; wherein the sliding plate is a sliding chuck, an outer periphery of the sliding chuck is provided with a sliding chuck tooth, a center of the sliding chuck is provided with a spline hole, the spline hole and the spline shaft cooperates to slide the sliding chuck between the first contact surface of the first electromagnetic sucker and the check ring; wherein the rotary plate is a rotary chuck, and an outer periphery of the rotary chuck is provided with an annular contact surface, a rotary chuck tooth is disposed between a center of the rotary chuck and the annular contact surface, a shape of the rotary chuck tooth is complementary to a shape of the sliding chuck tooth, and when the rotary chuck tooth and the sliding chuck tooth are arranged to form a closed loop, they are engaged and locked to each other; wherein a center of the first electromagnetic sucker is provided with a hollow shaft hole, a center of the spline shaft is provided with a hollow hole, a center of the rotary chuck is provided with a hollow through hole, and the rotary chuck tooth is disposed between the hollow through hole of the rotary chuck and the annular contact surface; wherein the axes of the hollow shaft hole of the first electromagnetic sucker, the hollow hole of the spline shaft, and the hollow through hole of the rotary chuck are coaxial.

Wherein the first electromagnetic sucker comprises a first electromagnetic sucker housing, a first electromagnetic coil and yoke, and a first isolation layer; the first electromagnetic sucker housing is provided with a U-shaped inner cavity; the first electromagnetic coil and yoke is disposed in the U-shaped inner cavity of the first electromagnetic sucker housing; the first isolation layer is filled in a space in the first electromagnetic sucker housing other than the first electromagnetic coil and yoke; and the second electromagnetic sucker comprises a second electromagnetic sucker housing, a second electromagnetic coil and yoke, and a second isolation layer; the second electromagnetic sucker housing is provided with a U-shaped inner cavity; the second electromagnetic coil and yoke is disposed in the U-shaped inner cavity of the second electromagnetic sucker housing; the second isolation layer is filled in a space in the second electromagnetic sucker housing other than the second electromagnetic coil and yoke.

Wherein the second electromagnetic sucker is fixedly connected to the first electromagnetic sucker, and the second electromagnetic sucker is provided with a second contact surface; the rotary plate is provided with an annular contact surface at a corresponding position; when the second electromagnetic sucker has an adsorption force, the annular contact surface of the rotary plate is adsorbed to the second contact surface of the second electromagnetic sucker.

Wherein the second electromagnetic sucker is sleeved on an outer surface of the first electromagnetic sucker; and the second electromagnetic sucker is fixedly sleeved on the outer surface of the first electromagnetic sucker through a magnetic isolation ring; wherein the magnetic isolation ring comprises adjacent side wall and bottom, and the side wall is fixedly connected to the outer surface of the first electromagnetic sucker through a side hole and a pin, and the bottom is fixedly connected to the second electromagnetic sucker through a screw hole and a screw.

Wherein the second electromagnetic sucker is fixedly connected to the rotary plate, and the second electromagnetic sucker is provided with a second contact surface; the first electromagnetic sucker is further provided with a annular contact surface at a corresponding position; when the second electromagnetic sucker has an adsorption force, the annular contact surface of the first electromagnetic sucker is adsorbed to the second contact surface of the second electromagnetic sucker.

Wherein the second electromagnetic sucker is a first permanent magnet type electromagnetic sucker, and the first permanent magnet type electromagnetic sucker is fixedly sleeved on the outer surface of the first electromagnetic sucker; the first permanent magnet type electromagnetic sucker comprises a first permanent magnet type electromagnetic sucker assembly and an annular permanent magnet; the annular permanent magnet is provided with a first permanent magnet contact surface; the rotary plate is provided with an annular contact surface at a corresponding position; when the first permanent magnet type electromagnetic sucker assembly has no adsorption force, the annular contact surface of the rotary plate is adsorbed to the first permanent magnet contact surface of the annular permanent magnet; when the first permanent magnet type electromagnetic sucker assembly has an adsorption force, the adsorption force of the annular permanent magnet is offset; wherein the first permanent magnet type electromagnetic sucker assembly comprises a third electromagnetic sucker housing, a third electromagnetic coil and yoke, and a third isolation layer; the third electromagnetic sucker housing is provided with a U-shaped inner cavity; the annular permanent magnet is disposed at a position of the U-shaped inner cavity of the third electromagnetic sucker housing adjacent to the rotary plate; the third electromagnetic coil and yoke is disposed at another location in the U-shaped inner cavity of the third electromagnetic sucker housing; the third isolation layer is filled in a space in the third electromagnetic sucker housing other than the third electromagnetic coil and yoke and the annular permanent magnet.

Wherein the second electromagnetic sucker is a second permanent magnet type electromagnetic sucker, a center of the first electromagnetic sucker is provided with a central shaft hole, and the second permanent magnet type electromagnetic sucker is fixedly disposed in the central shaft hole of the first electromagnetic sucker; the second permanent magnet type electromagnetic sucker comprises a second permanent magnet type electromagnetic sucker assembly and a columnar permanent magnet; the columnar permanent magnet is provided with a second permanent magnet contact surface; the rotary plate is provided with a third contact surface at a corresponding position; when the second permanent magnet type electromagnetic sucker assembly has no adsorption force, under an adsorption force of the columnar permanent magnet, the third contact surface of the rotary plate is adsorbed to the second permanent magnet contact surface of the columnar permanent magnet; when the second permanent magnet type electromagnetic sucker assembly has an adsorption force, the adsorption force of the columnar permanent magnet is offset; wherein the second permanent magnet type electromagnetic sucker assembly comprises a fourth electromagnetic sucker housing, a fourth electromagnetic coil and yoke, and a fourth isolation layer; the fourth electromagnetic sucker housing is provided with an inner cavity; the columnar permanent magnet is disposed at a position of the inner cavity of the fourth electromagnetic sucker housing adjacent to the rotary plate; the fourth electromagnetic coil and yoke is disposed at another position in the inner cavity of the fourth electromagnetic sucker housing; the fourth isolation layer is filled in a space in the fourth electromagnetic sucker housing other than the fourth electromagnetic coil and yoke and the columnar permanent magnet.

In order to solve the above technical problem, another technical solution adopted by the present disclosure is to provide a rotary joint comprising: a first joint connecting rod, a second joint connecting rod, and the rotary joint electromagnetic locking device described above, wherein The first joint connecting rod is coupled to the first electromagnetic sucker, and the second joint connecting rod is coupled to the rotary plate.

Wherein the rotary plate is provided with a plurality of connecting rod mounting holes that are spaced apart, and the rotary plate is connected to the second joint connecting rod through the plurality of the connecting rod mounting holes; the first joint connecting rod has a stepped hollow shaft, the first electromagnetic sucker is fixedly connected to the first joint connecting rod through the stepped hollow shaft, the second joint connecting rod is hinged with the stepped hollow shaft of the first joint connecting rod through a bearing, and the first joint connecting rod and the second joint connecting rod are connected in a pretensioned way to an entire brake joint by a nut and a thread at an end of the stepped hollow shaft.

The present disclosure has the following beneficial effects. The rotary joint locking device of the present disclosure comprises a first electromagnetic sucker, a sliding plate, a rotary plate, a connecting shaft connecting the first electromagnetic sucker and the sliding plate, and a second electromagnetic sucker, different from the prior art. When the first electromagnetic sucker and the second electromagnetic sucker have no adsorption force, the sliding plate and the rotary plate can be locked to each other; when the second electromagnetic sucker has an adsorption force, the rotary plate or the first electromagnetic sucker is adsorbed by the second electromagnetic sucker, making the sliding plate and the rotary plate to be further locked; when the first electromagnetic sucker has an adsorption force, the sliding plate can be adsorbed to the first contact surface of the first electromagnetic sucker, making the sliding plate released from the rotary plate. Whether the first electromagnetic sucker and the rotary plate is locked to each other or not is controlled by controlling the locking between the sliding plate and the rotary plate. When locked, the first electromagnetic sucker and the rotary plate are further locked by controlling the second electromagnetic sucker to adsorb the first electromagnetic sucker or the rotary plate, thereby shortening or eliminating the backlash between the first electromagnetic sucker and the rotary plate. The first joint connecting rod is connected to the first electromagnetic sucker, and the second joint connecting rod is connected to the rotary plate, such that the two rotary joints can be tightly locked, which is low in cost and can be manually operated.

BRIEF DESCRIPTION OF THE DRAWINGS

In order to more clearly illustrate the technical solutions in the embodiments of the present application, the drawings used in the description of the embodiments will be briefly described below. Apparently, the drawings in the following description are only some embodiments of the present application. Other drawings may also be obtained by those of ordinary skill in the art without any inventive work. In the drawings.

DETAILED DESCRIPTION OF EMBODIMENTS

Figure 1:
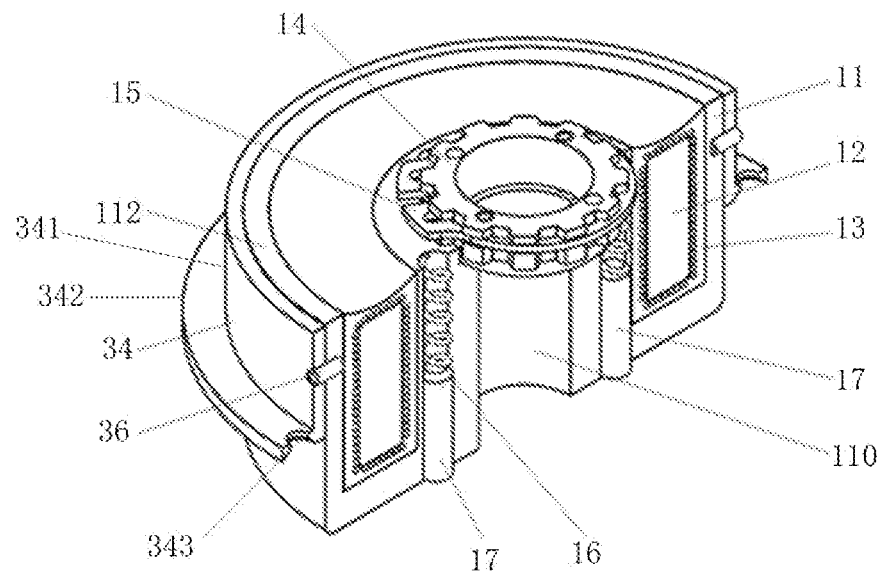
FIG. 1 is a schematic view of an embodiment of a first electromagnetic sucker of a rotary joint electromagnetic locking device of the present disclosure.

The technical solutions in the embodiments of the present application are clearly and completely described in the following with reference to the drawings in the embodiments of the present application. Apparently, the described embodiments are only a part of the embodiments of the present application, and not all embodiments. All other embodiments obtained by a person of ordinary skill in the art based on the embodiments of the present application without any inventive work are within the scope of the present application.

In the description of the present disclosure, it should be noted that the terms "center", "upper", "lower", "left", "right", "vertical", "horizontal", "inside", "outside", etc. indicating orientation or positional relationships are based on the orientation or positional relationship shown in the drawings, are merely for convenience of description of the present disclosure and a simplified description, and do not indicate or imply that the device or component referred to has a specific orientation and is constructed in a specific orientation. Thus, they are not to be construed as limiting the present disclosure. Moreover, the terms "first," "second," and "third" are used for descriptive purposes only and are not to be construed as indicating or implying relative importance.

In the description of the present disclosure, it should be noted that the terms "install", "connected", and "connect" are to be understood broadly, unless otherwise explicitly defined. For example, the components may be fixedly or detachably connected, or integrally connected; the connection may be mechanical or electrical; the components may be directly connected, or indirectly connected through an intermediate medium, or may be the internally communicated. The specific meaning of the above terms in the present disclosure can be understood in a specific case by those skilled in the art.

Referring to FIG. 1 to FIG. 12, FIG. 1 to FIG. 12 are schematic diagrams of various embodiments of the rotary joint electromagnetic locking device of the present disclosure under different states. The rotary joint locking device comprises a first electromagnetic sucker 1, a sliding plate 18, to rotary plate 2, a connecting shaft 14 and a second electromagnetic sucker 3.

The first electromagnetic sucker 1 is provided with a first contact surface 112; the sliding plate 18 is disposed on the first contact surface 112 of the first electromagnetic sucker 1, on which a first locking member 114 is disposed.

Under normal circumstances, the conventional electromagnetic sucker uses the electromagnetic principle to generate magnetic force by energizing the internal electromagnetic coil, and through the magnetic conductive panel, the workpiece contacting the surface of the panel is tightly sucked; and by powering off the electromagnetic coil, the magnetic force disappears to take away the workpiece. In the present embodiment, in the cases of energized and not, the first electromagnetic sucker 1 can be switched in a state between having a magnetic force and not, and having an adsorption force and not. The first electromagnetic sucker 1 may be a conventional electromagnetic sucker or another special electromagnetic sucker. The shape of the first electromagnetic sucker 1 may be a circle, a square, or the like.

Figure 6:
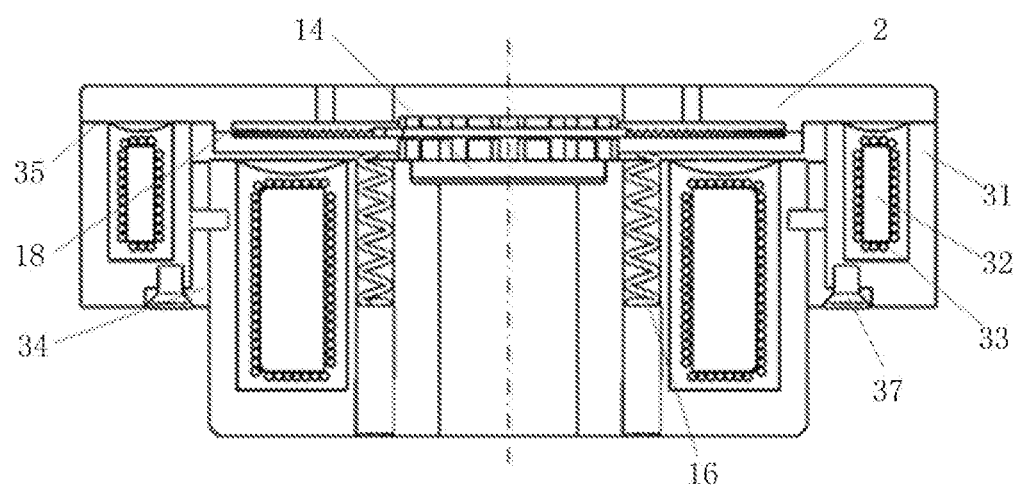
FIG. 6 is a cross-sectional view when the sliding plate and the rotary plate of the rotary joint electromagnetic locking device of the present disclosure are locked.
Figure 8:
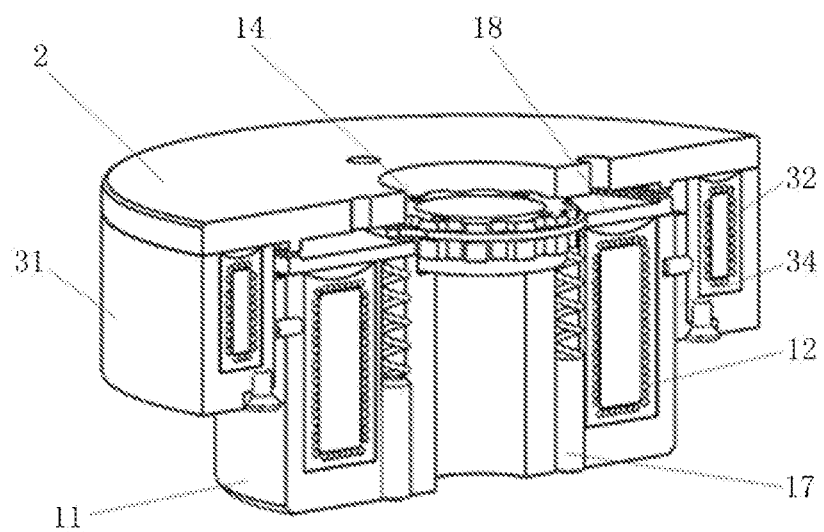
FIG. 8 is a perspective, cross-sectional view when the sliding plate and the rotary plate of the rotary joint electromagnetic locking device of the present disclosure are separated.
Figure 9:
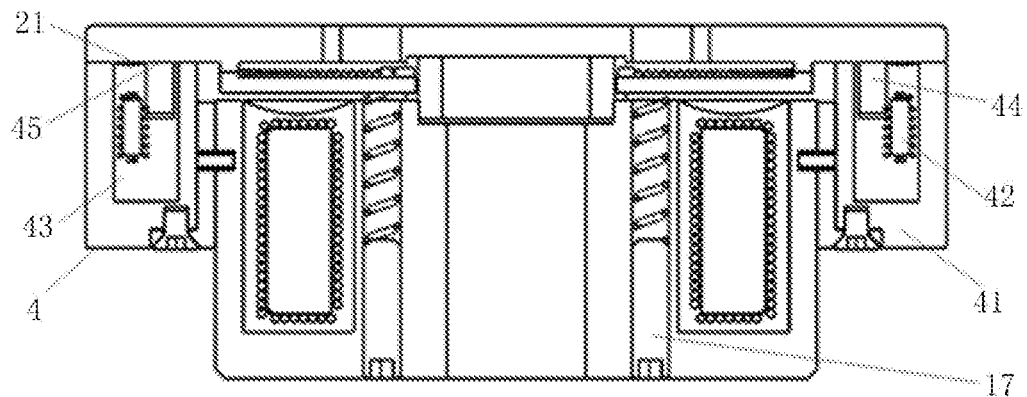
FIG. 9 is a cross-sectional view showing another embodiment of the rotary joint electromagnetic locking device of the present disclosure.

When the sliding plate 18 is locked with the rotary plate 2, the sliding plate 18 is not in contact with the first contact surface 112, and there is a gap between them (as shown in FIGS. 6 and 9). When the sliding plate 18 is in contact with the first contact surface 112, the sliding plate 18 is released from the rotary plate 2 (see FIGS. 3, 7, and 8). In general, the first contact surface 112 may be an end surface of a top portion of the first electromagnetic sucker 1; further, the first contact surface 112 may be a flat surface.

The rotary plate 2 is disposed corresponding to the sliding plate 18, the rotary plate 2 is provided with a second locking member 22 at a position corresponding to the first locking member 114 of the sliding plate 18, and the second locking member 22 and the first locking member 114 are mutually lockable.

The second locking member 22 and the first locking member 114 are structures capable of restricting rotation between the two rotary members. The second locking member 22 is locked with the first locking member 114, in a manner like engagement, snapping, and the like. The shape of the sliding plate 18 and the rotary plate 2 may be circular, square, or the like.

The connecting shaft 14 is for sequentially connecting the first electromagnetic sucker 1 and the sliding plate 18, and the connecting shaft 14 is capable of sliding the sliding plate 18 in the axial direction of the connecting shaft 14. When the first locking member 114 of the sliding plate 18 is locked with the rotary plate 2 of the second locking member 22, the connecting shaft 14 can restrict the rotation of the rotary plate 2.

The second electromagnetic sucker 3 is disposed with the first electromagnetic sucker 1 in a magnetically isolated way. The magnetic isolation of the second electromagnetic sucker 3 and the first electromagnetic sucker 1 means that, after the second electromagnetic sucker 3 and the first electromagnetic sucker 1 are fixed in place, the magnetic field and the magnetic flux generated by the second electromagnetic sucker 3 and the first electromagnetic sucker 1 are respectively separated from each other when they are energized, do not interfere with each other, and are independent of each other. In practical applications, a magnetically isolating material having a low magnetic permeability, such as an aluminum alloy, is generally selected to isolate the second electromagnetic sucker 3 from the first electromagnetic sucker 1. According to the shape of the magnetic isolating material in practical applications, it is referred to as a magnetic isolating sheet, a magnetic isolating plate, a magnetic isolating cover, a magnetic isolating ring, and the like.

In the present embodiment, in the cases of energized and not, the second electromagnetic sucker 3 can be switched in a state between having a magnetic force and not, and having an adsorption force and not. The second electromagnetic sucker 3 may be a conventional electromagnetic sucker, or may be another special electromagnetic sucker.

When neither the first electromagnetic sucker 1 nor the second electromagnetic sucker 3 has an adsorption force, the first locking member 114 on the sliding plate 18 and the second locking member 22 on the rotary plate 2 can be locked to each other; when the second electromagnetic sucker 3 has an adsorption force, the rotary plate 2 or the first electromagnetic sucker 1 is adsorbed by the second electromagnetic sucker, so that the first locking member 114 on the sliding plate 18 and the second locking member 22 on the rotary plate 2 are further locked; when the first electromagnetic sucker 1 has an adsorption force, the sliding plate 18 can be adsorbed to the first contact surface 112 of the first electromagnetic sucker 1, so that the first locking member 114 and the second locking member 22 on the rotary plate 2 cannot be locked and are released from each other.

The material of the rotary plate 2 and the sliding plate 18 or the material of the corresponding portions of the rotary plate 2 and the sliding plate 18 are generally selected as a magnetic material which can be easily adsorbed by the surrounding magnetic force. For example, said material may be Fe, Co, Ni elements and their alloys, rare earth elements and their alloys, as well as some Mn compounds, and the like.

The rotary joint locking device of the embodiment of the present disclosure comprises a first electromagnetic sucker 1, a sliding plate 18, a rotary plate 2, a connecting shaft 14 connecting the first electromagnetic sucker 1 and the sliding plate 18, and a second electromagnetic sucker 3. When both the first electromagnetic sucker 1 and the second electromagnetic sucker 3 have no adsorption force, the sliding plate 18 and the rotary plate 2 can be locked to each other. When the second electromagnetic sucker 3 has an adsorption force, the rotary plate 2 or the first electromagnetic sucker 1 is adsorbed by the second electromagnetic sucker 3, making the sliding plate 18 and the rotary plate 2 to be further locked. When the first electromagnetic sucker 1 has an adsorption force, the sliding plate 18 can be adsorbed to the first contact surface 112 of the first electromagnetic sucker 1, making the sliding plate 18 to be released from the rotary plate 2. Whether the first electromagnetic sucker 1 and the rotary plate 2 is locked to each other or not is controlled by controlling the locking between the sliding plate 18 and the rotary plate 2. When locked, the first electromagnetic sucker 1 and the rotary plate 2 are further locked by controlling the second electromagnetic sucker 3 to adsorb the first electromagnetic sucker 1 or the rotary plate 2, thereby shortening or eliminating the backlash between the first electromagnetic sucker 1 and the rotary plate 2. The technical solution provide support for tight locking between two rotary pieces, which is low in cost and can be manually operated.

Referring to FIG. 1, in an embodiment, the first electromagnetic sucker 1 is a typical electromagnetic sucker, that is, it has an adsorption force when energized, and does not have an adsorption force when powered off. The electromagnetic sucker has a simple structure and is relatively common. Specifically, the first electromagnetic sucker 1 includes a first electromagnetic sucker housing 11, a first electromagnetic coil and yoke 12, and a first isolation layer 13; the first electromagnetic sucker housing 11 is provided with a U-shaped inner cavity; the first electromagnetic coil and yoke 12 is disposed in the U-shaped inner cavity of the first electromagnetic sucker housing 11; the first isolation layer 13 is filled in a space in the first electromagnetic sucker housing 11 other than the first electromagnetic coil and yoke 12. In this embodiment, when the first electromagnetic sucker 1 is energized, it has an adsorption force, and when the first electromagnetic sucker 1 is powered off, it has no adsorption force. The first electromagnetic sucker housing 11 is a closed-loop cavity structure, specifically a U-shaped inner cavity formed by an inner annular wall, an outer annular wall and a bottom of the shell; the first electromagnetic coil and yoke 12 is placed in the U-shaped inner cavity, and the U-shaped space in the inner cavity is filled with the first isolation layer 13.

Figure 2:
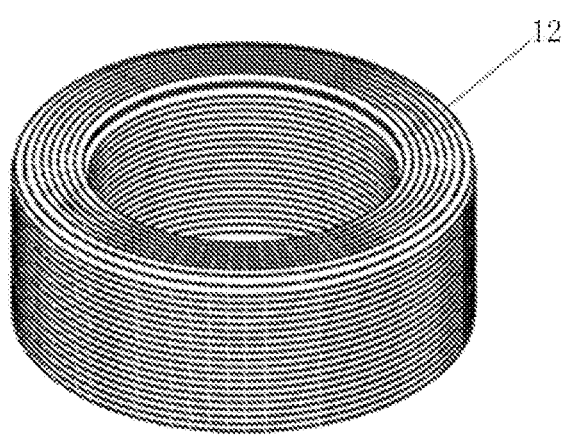
FIG. 2 is a schematic view showing the outline of an electromagnetic coil and yoke used in a first electromagnetic sucker of the rotary joint electromagnetic locking device of the present disclosure.

The first isolation layer 13 is used to isolate the first electromagnetic coil and yoke 12 and the first electromagnetic sucker housing 11, and the first isolation layer 13 can also be used to fix the first electromagnetic coil and yoke 12 in the first electromagnetic sucker housing 11. In a practical application, the material of the first isolation layer 13 is generally selected as being capable of melting into a liquid state when heated and solidified into a solid state after solidification. Typically, such material is generally non-metallic materials, most of which are non-conductive and light in material. For example, the material may be thermoplastic material, paraffin wax, and the like. Thermoplastic materials include polyethylene, polypropylene, polyvinyl chloride, polystyrene, polyoxymethylene, polycarbonate, polyamide, acrylic, and the like. The material is able to be melted into a liquid state when heated to a certain temperature, which is advantageous for sufficiently filling the space of the hollow cavity of the first electromagnetic sucker housing 11; the material solidifies in to a solid state after solidification, so that it serves as a support and a fixing for the first electromagnetic coil and yoke 12 in the U-shaped inner cavity. Referring to FIG. 2 in combination, the first electromagnetic coil and yoke 12 is a common structure in which a copper wire layer is wound around a magnetic steel to form a toroidal electromagnetic coil.

Referring to FIG. 6, in an embodiment, the basic structure of the second electromagnetic sucker 3 is similar to that of the first electromagnetic sucker 1. That is, the second electromagnetic sucker 3 comprises a second electromagnetic sucker housing 31, a second electromagnetic coil and yoke 32 and a second isolation layer 33. The second electromagnetic sucker housing 31 is provided with a U-shaped inner cavity. The second electromagnetic coil and yoke 32 is disposed in the U-shaped inner cavity of the second electromagnetic sucker housing 31. The second isolation layer 33 is filled in a space in the second electromagnetic sucker housing 31 other than the second electromagnetic coil and yoke 32. The material and function of the second isolation layer 33 are similar to those of the first isolation layer 13, and will not be described here.

Figure 10:
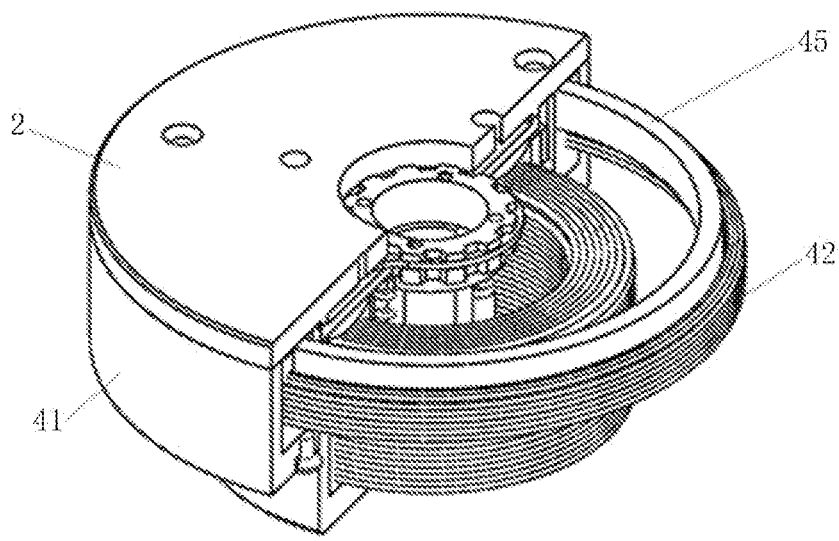
FIG. 10 is a cross-sectional view of FIG. 9.
Figure 12:
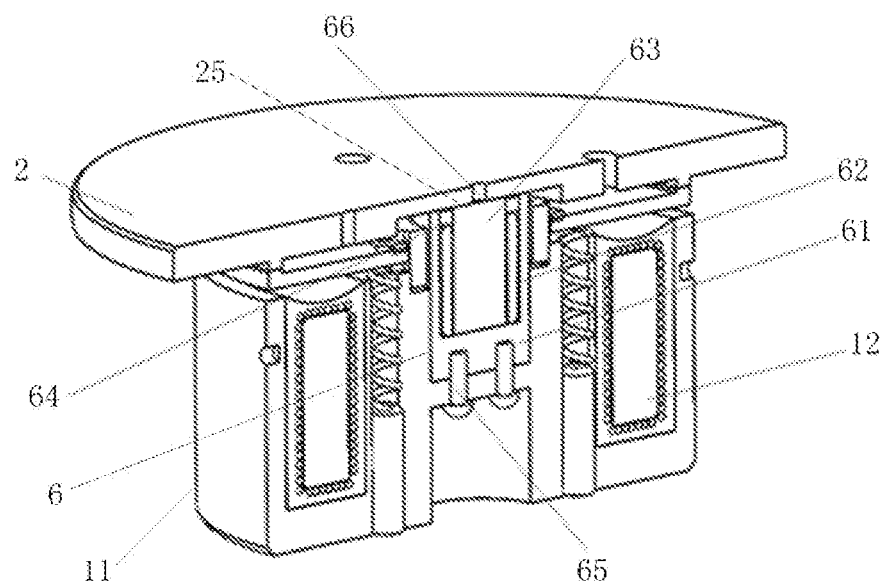
FIG. 12 is a cross-sectional view showing still another embodiment of the rotary joint electromagnetic locking device of the present disclosure.

Referring to FIGS. 9, 10 and 12, in another embodiment, the second electromagnetic sucker 3 is not a conventional electromagnetic sucker, but an electromagnetic sucker of a special structure.

Referring to FIGS. 9 and 10, the second electromagnetic sucker 3 is a first permanent magnet type electromagnetic sucker 4. Simply, the first permanent magnet type electromagnetic sucker 4 has both a permanent magnet and a conventional electromagnetic sucker, which is optimized in overall structure by combining a permanent magnet and a conventional electromagnetic sucker. Specifically, the first permanent magnet type electromagnetic sucker 4 includes a first permanent magnet type electromagnetic sucker assembly and a annular permanent magnet 44, and the first permanent magnet type electromagnetic sucker assembly includes a third electromagnetic sucker housing 41, a third electromagnetic coil and yoke 42 and a third isolation layer 43. The third electromagnetic sucker housing 41 is provided with a U-shaped inner cavity. The annular permanent magnet 44 is disposed in the U-shaped inner cavity of the third electromagnetic sucker housing 41 at a position adjacent to the rotary plate 2. The third electromagnetic coil and yoke 42 is disposed at another position in the U-shaped inner cavity of the third electromagnetic sucker housing 41. The third isolation layer 43 is filled in a space in the third electromagnetic sucker housing 41 other than the third electromagnetic coil and yoke 42 and the annular permanent magnet 44. The material and function of the third isolation layer 43 are similar to those of the first isolation layer 13, and will not be described here.

Referring to FIG. 12, the second electromagnetic sucker 3 is a second permanent magnet type electromagnetic sucker 6, and the second permanent magnet type electromagnetic sucker 6 comprises a second permanent magnet type electromagnetic sucker assembly and a columnar permanent magnet 63. The second permanent magnet type electromagnetic sucker assembly includes a fourth electromagnetic sucker housing 61, a fourth electromagnetic coil and yoke 62, and a fourth isolation layer 64. The fourth electromagnetic sucker housing 61 is provided with an inner cavity. The columnar permanent magnet 63 is disposed in the inner cavity of the fourth electromagnetic sucker housing 61 at a position adjacent to the rotary plate 2. The fourth electromagnetic coil and yoke 62 is disposed at another position in the inner cavity of the fourth electromagnetic sucker housing 61. The fourth isolation layer 64 is filled in a space in the fourth electromagnetic sucker housing 61 other than the fourth electromagnetic coil and yoke 62 and the columnar permanent magnet 63. The material and function of the fourth isolation layer 64 are similar to those of the first isolation layer 13, and will not be described here.

When the permanent magnet type electromagnetic sucker of the above structure is powered off, the electromagnetic sucker component does not generate a magnetic field while the permanent magnet generates a magnetic field, so that the permanent magnet type electromagnetic sucker has a magnetic force and has an adsorption force. When energized, the electromagnetic sucker component generates a magnetic field, the permanent magnet generates a magnetic field, and the magnetic field generated by the electromagnetic sucker assembly is opposite to and can offset the magnetic field generated by the permanent magnet, so that the permanent magnet type electromagnetic sucker does not have a magnetic force and does not have an adsorption force.

Figure 3:
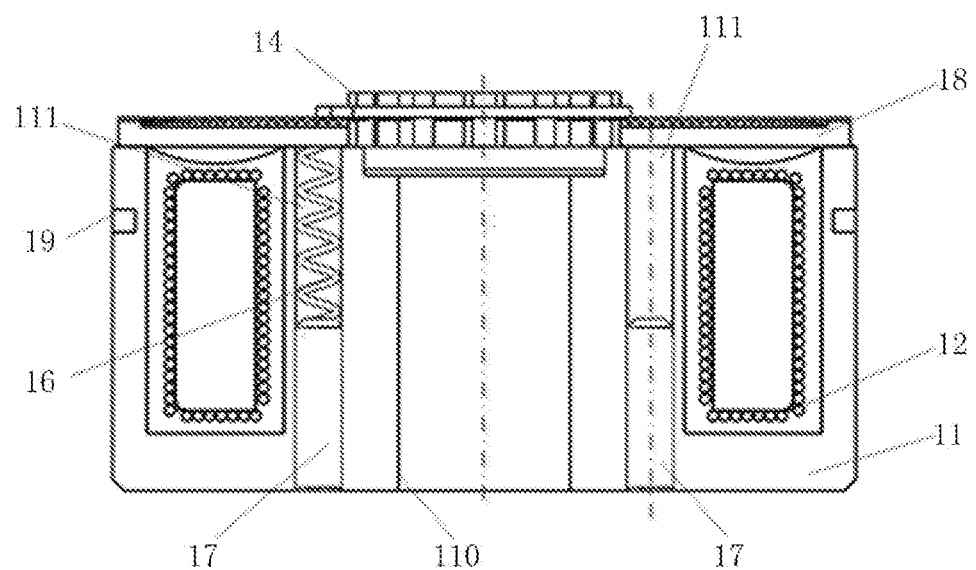
FIG. 3 is a cross-sectional view showing a state in which a first electromagnetic sucker and a sliding plate of the rotary joint electromagnetic locking device of the present disclosure are adsorbed.

Referring to FIGS. 1 and 3, the rotary joint locking device further includes a plurality of elastic members 16 spaced apart from each other on the first electromagnetic sucker 1. Each elastic member 16 include a first end and an opposite second end, where the first end abuts the first electromagnetic sucker 1 and the second end abuts the sliding plate 18. When the elastic member 16 is in a natural state, the elastic member 16 protrudes beyond a first contact surface 112 of the first electromagnetic sucker 1.

The elastic member 16 can be specifically a spring 16. The fact that the elastic member 16 is in a natural state means that the elastic member 16 is not subjected to any force. When the elastic member 16 is in a natural state, the elastic member 16 protrudes beyond the first contact surface 112 of the first electromagnetic sucker 1, with its first end abutting the first electromagnetic sucker 1 and its second end abutting the sliding plate 18. When the sliding plate 18 is locked with the rotary plate 2, the length and parameters of the elastic member 16 are controlled so that it is in a stressed state, the sliding plate 18 and the rotary plate 2 are locked with a certain fixed load torque.

In order to achieve load adjustment, in an embodiment, the first electromagnetic sucker 1 is circumferentially provided with a plurality of threaded holes 111 that are spaced apart, and one end of each of the threaded holes 111 is provided with a top thread 17 rotatable along the threaded hole 111. A portion of the elastic member 16 is located within the threaded hole 111 and the first end of the elastic member 16 abuts the top thread 17. The compression amount of the elastic member 16 can be controlled by the top thread 17, thereby adjusting the engagement force between the sliding plate 18 and the rotary plate 2, that is, adjusting the load upon locking.

The connecting shaft 14 is located at a center of the first electromagnetic sucker 1, and the connecting shaft 14 is a spline shaft 14. When the spline shaft 14 is connected to the first electromagnetic sucker 1, it can be fixed to the first electromagnetic sucker 1 by pins and screws. The spline shaft 14 is provided with a check ring 15 which is located between the sliding plate 18 and the rotary plate 2. Specifically, one end of the spline shaft 14 is provided with a groove, and a check ring 15 is disposed in the groove.

The center of the first electromagnetic sucker 1 is provided with a hollow shaft hole 110. An outer part of the first electromagnetic sucker housing 11 relative to the hollow shaft hole 110 is circumferentially and evenly provided with threaded holes 111, and a bottom side of the first electromagnetic sucker housing 11 is screwed into the top thread 17. The spring 16 is placed in an upper part of the threaded hole 111. The sliding plate 18 is placed between the first contact surface 112 at the top of the first electromagnetic sucker housing 11 and the check ring 15, and the sliding plate 18 can be slided on the spline shaft 14 between a first contact surface 112 of the first electromagnetic sucker and the check rings 15. When the first electromagnetic coil and yoke 12 is powered off, the sliding plate 18 is forced by the spring 16 against the check ring 15.

The center of the spline shaft 14 is provided with a hollow hole, and the hollow hole on the spline shaft 14 is concentrically mounted with the hollow shaft hole 110. When the spline shaft 14 is connected to the first electromagnetic sucker 1, it is fixed to the first electromagnetic sucker housing 11 by pins and screws.

Figure 4:
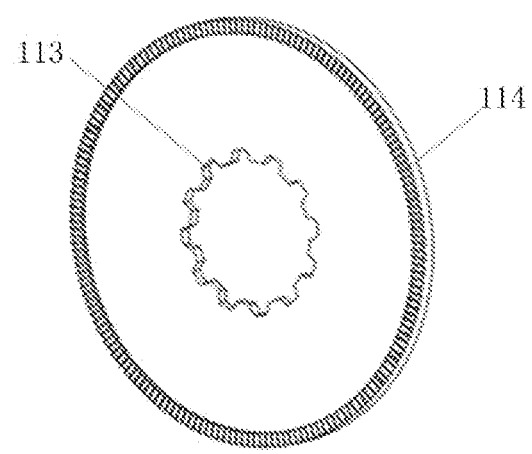
FIG. 4 is a schematic view of an embodiment of a sliding plate of a rotary joint electromagnetic locking device of the present disclosure.
Figure 5:
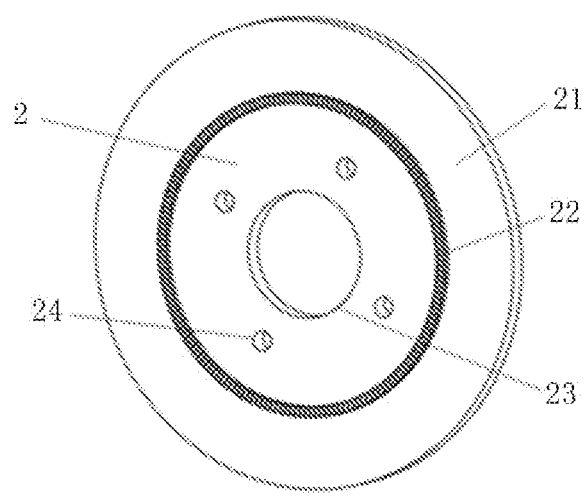
FIG. 5 is a schematic view of an embodiment of a rotary plate of a rotary joint electromagnetic locking device of the present disclosure.

Referring to FIGS. 4 and 5, the sliding plate 18 is a sliding chuck 18, and an outer periphery of the sliding chuck 18 is provided with a sliding chuck tooth 114. In this embodiment, the sliding chuck tooth 114 is a triangular tooth. In practical applications, the sliding chuck tooth 114 may also be a trapezoidal tooth in consideration of issues such as cooperation and manufacturing, and is not specifically limited herein. The center of the sliding chuck 18 is provided with a spline hole 113, and the spline hole 113 is matched with the spline shaft 14, so that the sliding chuck 18 is slid between the first contact surface 112 of the first electromagnetic sucker 1 and the check ring 15.

The rotary plate 2 is a rotary chuck 2, and an outer periphery of the rotary chuck 2 is provided with an annular contact surface 21. A rotary chuck tooth 22 is disposed between the center of the rotary chuck 2 and the annular contact surface 21, and the rotary chuck tooth 22 is complementary in shape to the sliding chuck tooth 114. When the rotary chuck tooth 22 and the sliding chuck tooth 114 are arranged to form a closed loop, they can be engaged and locked with each other. In an embodiment, the center of the rotary chuck 2 is provided with a hollow through hole 23, and the rotary chuck tooth 22 is disposed between the hollow through hole 23 of the rotary chuck 2 and the annular contact surface 21.

The axial centers of the hollow shaft hole 110 of the first electromagnetic sucker 1, the hollow hole of the spline shaft 14, and the hollow through hole 23 of the rotary chuck 2 are co-axial.

When the second electromagnetic sucker 3 has an adsorption force, the rotary plate 2 or the first electromagnetic sucker 1 is adsorbed by the second electromagnetic sucker 3, and the second electromagnetic sucker 3, the rotary plate 2 and the first electromagnetic sucker 1 are fixed in two ways. Where in the first fixation way, the second electromagnetic sucker 3 is fixedly connected to the first electromagnetic sucker 1, and the second electromagnetic sucker 3 adsorbs and fixes the rotary plate 2, so that slide could not occur between the rotary plate 2 and the second electromagnetic sucker 3, therefore the rotary plate 2 and the first electromagnetic sucker 1 are further locked; in the second fixation way, the second electromagnetic sucker 3 is fixedly connected to the rotary plate 2, and the second electromagnetic sucker 3 adsorbs and fixes the first electromagnetic sucker 1, so that slide could not occur between the first electromagnetic sucker 1 and the second electromagnetic sucker 3, therefore the rotary plate 2 and the first electromagnetic sucker 1 are further locked.

In each of the above fixation ways, according to different structures of the first electromagnetic sucker 1, the specific positions of the second electromagnetic sucker 3 are also different. For example, the size of the second electromagnetic sucker 3 can be larger than that of the first electromagnetic sucker 1, and is disposed at an outer surface of the first electromagnetic sucker 1; alternatively, if the first electromagnetic sucker 1 is provided with a hollow shaft hole 110, the size of the second electromagnetic sucker 3 can be greatly reduced, and it is disposed inside the first electromagnetic sucker 1 (such as the hollow shaft hole 110). In both fixation ways, it is required that when the second electromagnetic sucker 3 has an adsorption force, the rotary plate 2 or the first electromagnetic sucker 1 can be adsorbed by the second electromagnetic sucker 3.

The above fixation ways and the specific positions of the second electromagnetic sucker 3 will be described in detail below in several embodiments. It should be noted that the above two fixation ways and the specific position of the second electromagnetic sucker 3 are not related to the components of the first electromagnetic sucker 1 and the second electromagnetic sucker 3. That is, the first electromagnetic sucker 1 and the second electromagnetic sucker 3 may be conventional electromagnetic suckers, or they can be other special electromagnetic suckers, or combinations of the conventional electromagnetic suckers and special electromagnetic suckers.

Referring to FIGS. 1, 3, and 6-8, the first electromagnetic sucker 1 and the second electromagnetic sucker 3 are exemplified by a conventional electromagnetic sucker. The second electromagnetic sucker 3 is fixedly connected to the first electromagnetic sucker 1, and the second electromagnetic sucker 3 is provided with a second contact surface 35 (toward the annular contact surface 21 of the rotary plate 2); the rotary plate 2 is provided with an annular contact surface 21 at a corresponding position; when the second electromagnetic sucker 3 has an adsorption force, the annular contact surface 21 of the rotary plate 2 can be adsorbed to the second contact surface 35 of the second electromagnetic sucker 3.

In this embodiment, the second electromagnetic sucker 3 is fixedly sleeved on an outer surface of the first electromagnetic sucker 1; specifically, the second electromagnetic sucker 3 is fixedly sleeved on the outer surface of the first electromagnetic sucker 1 through the magnetic isolation ring 34.

Specifically, the magnetic isolation ring 34 includes an side wall 341 and an adjacent bottom portion 342. The side wall 341 is fixedly connected to an outer surface of the first electromagnetic sucker 1 through the side hole 19 and the pin 36, and the bottom portion 342 is fixedly connected to the second electromagnetic sucker 3 through the screw hole 343 and the screw 37.

Referring to FIG. 6, when the first electromagnetic coil and yoke 12 is powered off, the sliding chuck 18 is pushed by the spring 16 toward the rotary chuck 2 and engaged therewith. When the second electromagnetic coil and yoke 32 is energized, the annular contact surface 21 of the rotary chuck 2 can be adsorbed to the second contact surface 35 of the second electromagnetic sucker, while the rotary chuck tooth 22 and the sliding chuck tooth 114 are engaged with each other. Since the annular contact surface 21 is adsorbed to and in contact with the second contact surface 35 of the second electromagnetic sucker 3, when the rotary chuck 2 and the second electromagnet sucker 3 are axially pretensioned, there is no backlash between the rotary chuck 2 and the second electromagnetic sucker 3. When the external load increases and the friction between the annular contact surface 21 and the second contact surface 35 of the second electromagnetic sucker 3 is overcome, the sliding chuck 18 and the rotary chuck 2 will bear the load. Before the yield strength of the engaged teeth is reached, the load torque required to separate the sliding chuck 18 from the rotary chuck 2 is determined and adjusted by the parameters of the spring 16 and the twisting depth of the top thread 17.

Figure 7:
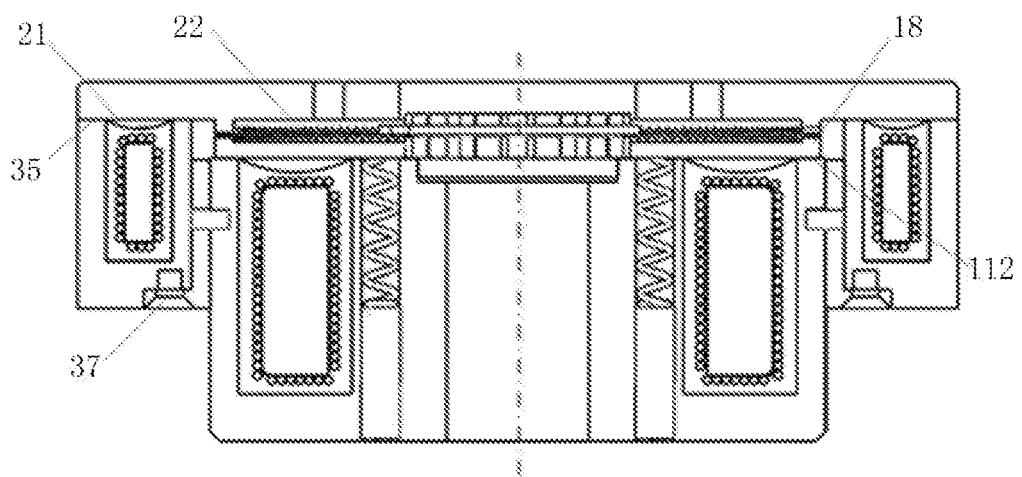
FIG. 7 is a cross-sectional view when the sliding plate and the rotary plate of the rotary joint electromagnetic locking device of the present disclosure are separated.

Referring to FIGS. 7 and 8, when the first electromagnetic coil and yoke 12 is energized, the generated magnetic field will adsorb the sliding chuck 18 to the first contact surface 112 of the first electromagnetic sucker housing 11 against the elastic force of the spring 16. When the second electromagnetic coil and yoke 32 is powered off, the magnetic field of the second electromagnetic sucker 3 disappears, and the annular contact surface 21 of the rotary chuck 2 and the second contact surface 35 of the second electromagnetic sucker 3 do not have a magnetic force. The rotary chuck 2 is rotatable relative to the first electromagnetic sucker 1 and the second electromagnetic sucker 3.

Referring to FIGS. 9 and 10, the first electromagnetic sucker 1 is exemplified by a conventional electromagnetic sucker, and the second electromagnetic sucker 3 is exemplified by a first permanent magnet type electromagnetic sucker 4.

The first permanent magnet type electromagnetic sucker 4 is fixedly connected to the first electromagnetic sucker 1, and the first permanent magnet type electromagnetic sucker 4 includes a first permanent magnet type electromagnetic sucker assembly and an annular permanent magnet 44. The annular permanent magnet 44 is provided with the first a permanent magnet contact surface 45. The rotary plate 2 is provided with an annular contact surface 21 at a corresponding position. When the first permanent magnet type electromagnetic sucker assembly has no adsorption force, under the adsorption force of the annular permanent magnet 44, the annular contact surface 21 of the rotary plate 2 can be adsorbed to the first permanent magnet contact surface 45 of the annular permanent magnet 44. When the first permanent magnet type electromagnetic sucker assembly has an adsorption force, the adsorption force of the annular permanent magnet 44 can be offset. In the present embodiment, the first permanent magnet type electromagnetic sucker 4 is fixedly sleeved on the outer surface of the first electromagnetic sucker 1 through the magnetic isolation ring 34.

When both the first electromagnetic coil and yoke 12 and the third electromagnetic coil and yoke 42 are powered off, the annular contact surface 21 of the rotary chuck 2 is adsorbed to the first permanent magnet contact surface 45 of the annular permanent magnet 44, and the rotary chuck tooth 22 is engaged with the sliding chuck tooth 114. When the rotary chuck 2 and the first permanent magnet electromagnetic sucker 4 are axially pretensioned, the rotary chuck 2 is adsorbed to the first permanent magnet sucker 4 and cannot rotate relative thereto due to surface friction. When the first electromagnetic coil and yoke 12 and the third electromagnetic coil and yoke 42 are both energized, the sliding chuck 18 is adsorbed to the first contact surface 112 at an upper end of the first electromagnetic sucker 1, the magnetic field of the annular permanent magnet 44 on an upper surface of the first permanent magnet type electromagnetic sucker 4 is offset by the third electromagnetic coil and yoke 42, and the rotary chuck 2 can be rotatable relative to the first electromagnetic sucker 1 and the first permanent magnet type electromagnetic sucker 4.

Referring to FIG. 12, the center of the first electromagnetic sucker 1 is provided with a central shaft hole 110, and the second permanent magnet type electromagnetic sucker 6 is fixedly disposed in the central shaft hole 110 of the first electromagnetic sucker 1.

A fourth electromagnetic sucker housing 61, a fourth electromagnetic coil and yoke 62, a columnar permanent magnet 63 and a fourth isolation layer 64 are placed in the central shaft hole 110 of the first electromagnetic sucker housing 11, and the fourth electromagnetic sucker housing 61 is fixed to the first electromagnetic sucker housing 11 by the screw 65. The columnar permanent magnet 63 is provided with a second permanent magnet contact surface 66, and the rotary plate 2 is provided with a third contact surface 25 at a corresponding position. When the second permanent magnet type electromagnetic sucker assembly has no adsorption force, under the adsorption force of the columnar permanent magnet 63, the third contact surface 25 of the rotary plate 2 can be adsorbed to the second permanent magnet contact surface 66 of the columnar permanent magnet 63. When the second permanent magnet type electromagnetic sucker assembly has an adsorption force, the adsorption force of the columnar permanent magnet can be offset. In this embodiment, the effects in FIGS. 9 and 10 can also be achieved in principle.

Figure 11:
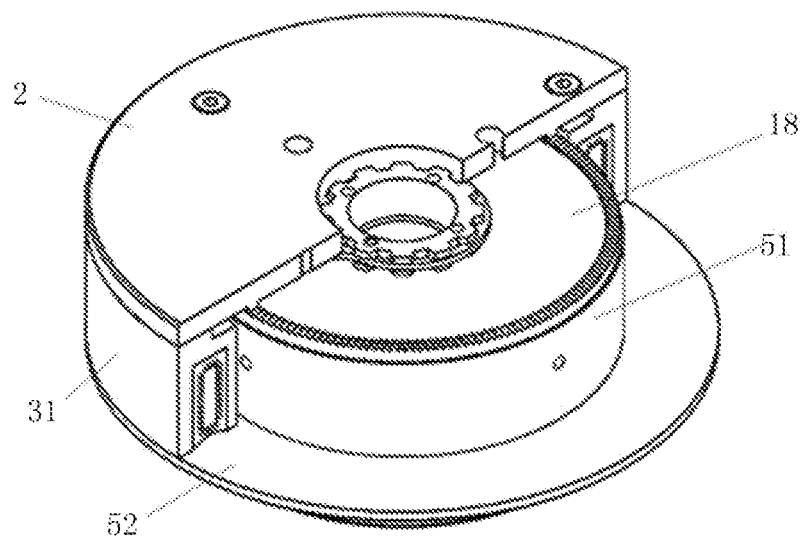
FIG. 11 is a cross-sectional view showing still another embodiment of the rotary joint electromagnetic locking device of the present disclosure.

Referring to FIG. 11, FIG. 11 is different from FIGS. 6 and 7 in that, the second electromagnetic sucker 3 in FIGS. 6 and 7 is turned upside down by 180 degrees, the second electromagnetic sucker 3 and the rotary plate 2 are fixedly connected together, the second electromagnetic sucker 3 is provided with a second contact surface 35 (toward the annular contact surface 52 of the first electromagnetic sucker 1), the first electromagnetic sucker 1 is further provided with an annular contact surface 52 at a corresponding position, and when the second electromagnetic sucker 3 has an adsorption force, the annular contact surface 52 of the first electromagnetic sucker 1 can be adsorbed to the second contact surface 35 of the second electromagnetic sucker 3.

Specifically, an annular contact surface 52 is formed on an outer circumferential surface of the first electromagnetic sucker housing 11 to form a new electromagnetic sucker housing 51, and the annular contact surface 52 can be adsorbed to the second contact surface 35 at a lower end of the second electromagnetic sucker housing 31. Thus, the effects of FIGS. 6 and 7 can be achieved.

Figure 13:
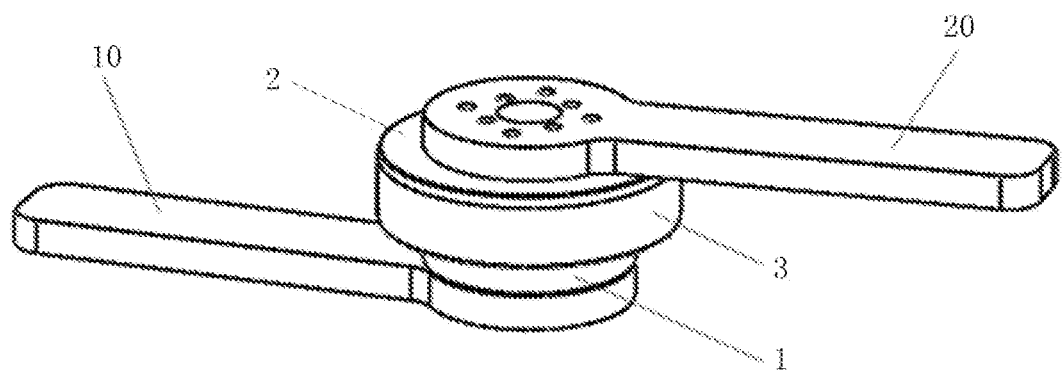
FIG. 13 is a schematic view of an embodiment of a rotary joint of the present disclosure.

Referring to FIG. 13, FIG. 13 is a schematic view of an embodiment of a rotary joint according to the present disclosure. The rotary joint includes a first joint connecting rod 10, a second joint connecting rod 20, and a rotary joint electromagnetic locking device described above. The first joint connecting rod 10 is connected to the first electromagnetic sucker 1, and the second joint connecting rod 20 is connected to the rotary plate 2. A detailed description of the rotary joint electromagnetic locking device can be referred to the above for, and will not be described here.

Figure 14:
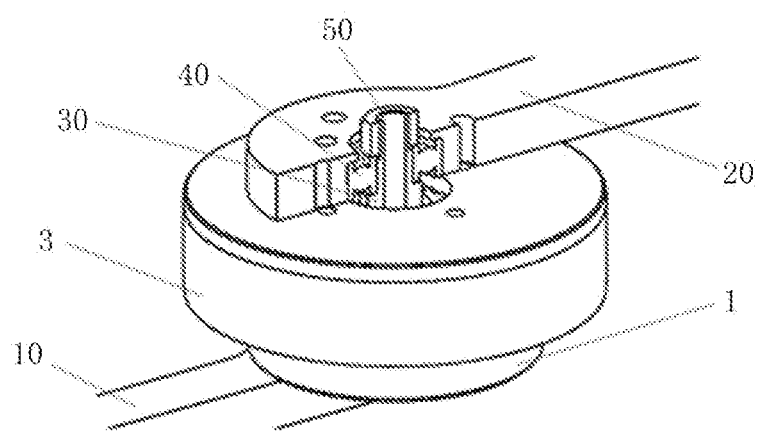
FIG. 14 is a schematic view showing a typical connection and pretension method of the rotary joint of the present disclosure.

Referring to FIG. 14, in an embodiment, the rotary plate 2 is provided with a plurality of connecting rod mounting holes 24 that are spaced apart, and the rotary plate 2 is connected to the second joint connecting rod 20 through the plurality of connecting rod mounting holes 24. The first joint connecting rod 10 has a stepped hollow shaft 30, and the first electromagnetic sucker 1 is fixedly connected to the first joint connecting rod 10 through the stepped hollow shaft 30. Specifically, the first joint connecting rod 10 is connected to the first electromagnetic sucker housing 11 through the mounting holes. The second joint connecting rod 20 is hinged to the stepped hollow shaft 30 of the first joint connecting rod 10 through a bearing 40, and the first joint connecting rod 10 and the second joint connecting rod 20 is connected to the entire brake joint in a pretensioned manner through the nut 50 and the thread at an end of the stepped hollow shaft 30.

For example, when the first electromagnetic coil and yoke 12 is powered off and the second electromagnetic coil and yoke 32 is energized, the rotary claw plate 2 and the first electromagnetic sucker 1 are reliably locked to each other, and the first joint connecting rod 10 and the first and the second joint connecting rod 20 cannot rotate relative to each other.

The rotary joint of the embodiment of the present disclosure includes the above-mentioned electromagnetic locking device, which comprises a first electromagnetic sucker 1, a sliding plate 18, a rotary plate 2, a connecting shaft 14 connecting the first electromagnetic sucker 1 and the sliding plate 18, and a second electromagnetic sucker 3. When both the first electromagnetic sucker 1 and the second electromagnetic sucker 3 have no adsorption force, the sliding plate 18 and the rotary plate 2 can be locked to each other. When the second electromagnetic sucker 3 has an adsorption force, the rotary plate 2 or the first electromagnetic sucker 1 is adsorbed by the second electromagnetic sucker 3, making the sliding plate 18 and the rotary plate 2 to be further locked. When the first electromagnetic sucker 1 has an adsorption force, the sliding plate 18 can be adsorbed to the first contact surface 112 of the first electromagnetic sucker 1, making the sliding plate 18 to be released from the rotary plate 2. Whether the first electromagnetic sucker 1 and the rotary plate 2 is locked to each other or not is controlled by controlling the locking between the sliding plate 18 and the rotary plate 2. When locked, the first electromagnetic sucker 1 and the rotary plate 2 are further locked by controlling the second electromagnetic sucker 3 to adsorb the first electromagnetic sucker 1 or the rotary plate 2, thereby shortening or eliminating the backlash between the first electromagnetic sucker 1 and the rotary plate 2. The first joint connecting rod 10 is connected to the first electromagnetic sucker 1, and the second joint connecting rod 20 is connected to the rotary disk 2. In this way, tight locking between two rotary pieces is enabled, which is low in cost and can be manually y operated.

The above are only preferred embodiments of the present disclosure, and are not intended to limit the scope of the present disclosure. Equivalent structure or equivalent process transformations made based on the description of the present disclosure and the drawings, or direct or indirect application to other related technical fields are encompassed in the scope of protection of the present disclosure.

What is claimed is:

1. A rotary joint electromagnetic locking device, comprising:
   a first electromagnetic sucker provided with a first contact surface;
   a sliding plate disposed on the first contact surface of the first electromagnetic sucker, a first locking member being disposed on the sliding plate;
   a rotary plate corresponding to the sliding plate, the rotary plate being provided with a second locking member at a position corresponding to the first locking member of the sliding plate, the second locking member and the first locking member being configured for locking each other;
   a connecting shaft for sequentially connecting the first electromagnetic sucker and the sliding plate, the connecting shaft being configured for sliding the sliding plate in an axial direction of the connecting shaft, when the first locking member of the sliding plate is locked with the second locking member of the rotary plate, the connecting shaft being configured for restricting rotation of the rotary plate;
   a second electromagnetic sucker disposed with the first electromagnetic sucker in a magnetically isolated way;
   wherein when neither the first electromagnetic sucker nor the second electromagnetic sucker has an adsorption force, the first locking member on the sliding plate and the second locking member on the rotary plate are locked to each other, when the second electromagnetic sucker has an adsorption force, the rotary plate or the first electromagnetic sucker is adsorbed by the second electromagnetic sucker, so that the first locking member on the sliding plate and the second locking member on the rotary plate are further locked; when the first electromagnetic sucker has an adsorption force, the sliding plate is adsorbed to the first contact surface of the first electromagnetic sucker, so that the first locking member and the second locking member on the rotary plate are unlocked and released.

2. The rotary joint electromagnetic locking device according to claim 1, wherein the rotary joint locking device comprises a plurality of elastic members, and the plurality of elastic members are spaced apart from each other on the first electromagnetic sucker and each comprises opposite first end and second end, the first end abutting the first electromagnetic sucker, and the second end abutting the sliding plate, when the elastic member is in a natural state, the elastic member protrudes beyond the first contact surface of the first electromagnetic sucker;
   wherein the first electromagnetic sucker is circumferentially provided with a plurality of threaded holes that are spaced apart, one end of each of the threaded hole being provided with a top thread rotatable along the threaded hole, a part of the elastic member being located within the threaded hole, and the first end of the elastic member abutting the top thread;
   wherein the connecting shaft is located at a center of the first electromagnetic sucker, the connecting shaft is a spline shaft, the spline shaft is provided with a check ring, and the check ring is located between the sliding plate and the rotary plate;
   wherein the sliding plate is a sliding chuck, an outer periphery of the sliding chuck is provided with a sliding chuck tooth, a center of the sliding chuck is provided with a spline hole, the spline hole and the spline shaft cooperates to slide the sliding chuck between the first contact surface of the first electromagnetic sucker and the check ring;
   wherein the rotary plate is a rotary chuck, and an outer periphery of the rotary chuck is provided with an annular contact surface, a rotary chuck tooth is disposed between a center of the rotary chuck and the annular contact surface, a shape of the rotary chuck tooth is complementary to a shape of the sliding chuck tooth, and when the rotary chuck tooth and the sliding chuck tooth are arranged to form a closed loop, they are engaged and locked to each other;
   wherein a center of the first electromagnetic sucker is provided with a hollow shaft hole, a center of the spline shaft is provided with a hollow hole, a center of the rotary chuck is provided with a hollow through hole, and the rotary chuck tooth is disposed between the hollow through hole of the rotary chuck and the annular contact surface;
   wherein the axes of the hollow shaft hole of the first electromagnetic sucker, the hollow hole of the spline shaft, and the hollow through hole of the rotary chuck are coaxial.

3. The rotary joint electromagnetic locking device according to claim 1, wherein the first electromagnetic sucker comprises a first electromagnetic sucker housing, a first electromagnetic coil and yoke, and a first isolation layer; the first electromagnetic sucker housing is provided with a U-shaped inner cavity; the first electromagnetic coil and yoke is disposed in the U-shaped inner cavity of the first electromagnetic sucker housing; the first isolation layer is filled in a space in the first electromagnetic sucker housing other than the first electromagnetic coil and yoke; and the second electromagnetic sucker comprises a second electromagnetic sucker housing, a second electromagnetic coil and yoke, and a second isolation layer; the second electromagnetic sucker housing is provided with a U-shaped inner cavity; the second electromagnetic coil and yoke is disposed in the U-shaped inner cavity of the second electromagnetic sucker housing; the second isolation layer is filled in a space in the second electromagnetic sucker housing other than the second electromagnetic coil and yoke.

4. The rotary joint electromagnetic locking device according to claim 3, wherein the second electromagnetic sucker is fixedly connected to the first electromagnetic sucker, and the second electromagnetic sucker is provided with a second contact surface; the rotary plate is provided with an annular contact surface at a corresponding position; when the second electromagnetic sucker has an adsorption force, the annular contact surface of the rotary plate is adsorbed to the second contact surface of the second electromagnetic sucker.

5. The rotary joint electromagnetic locking device according to claim 4, wherein the second electromagnetic sucker is sleeved on an outer surface of the first electromagnetic sucker; and the second electromagnetic sucker is fixedly sleeved on the outer surface of the first electromagnetic sucker through a magnetic isolation ring;

wherein the magnetic isolation ring comprises adjacent side wall and bottom, and the side wall is fixedly connected to the outer surface of the first electromagnetic sucker through a side hole and a pin, and the bottom is fixedly connected to the second electromagnetic sucker through a screw hole and a screw.

6. The rotary joint electromagnetic locking device according to claim 3, wherein the second electromagnetic sucker is fixedly connected to the rotary plate, and the second electromagnetic sucker is provided with a second contact surface; the first electromagnetic sucker is further provided with a annular contact surface at a corresponding position;

when the second electromagnetic sucker has an adsorption force, the annular contact surface of the first electromagnetic sucker is adsorbed to the second contact surface of the second electromagnetic sucker.

7. The rotary joint electromagnetic locking device according to claim 1, wherein the second electromagnetic sucker is a first permanent magnet type electromagnetic sucker, and the first permanent magnet type electromagnetic sucker is fixedly sleeved on the outer surface of the first electromagnetic sucker; the first permanent magnet type electromagnetic sucker comprises a first permanent magnet type electromagnetic sucker assembly and an annular permanent magnet; the annular permanent magnet is provided with a first permanent magnet contact surface; the rotary plate is provided with an annular contact surface at a corresponding position; when the first permanent magnet type electromagnetic sucker assembly has no adsorption force, the annular contact surface of the rotary plate is adsorbed to the first permanent magnet contact surface of the annular permanent magnet; when the first permanent magnet type electromagnetic sucker assembly has an adsorption force, the adsorption force of the annular permanent magnet is offset;

wherein the first permanent magnet type electromagnetic sucker assembly comprises a third electromagnetic sucker housing, a third electromagnetic coil and yoke, and a third isolation layer; the third electromagnetic sucker housing is provided with a U-shaped inner cavity; the annular permanent magnet is disposed at a position of the U-shaped inner cavity of the third electromagnetic sucker housing adjacent to the rotary plate; the third electromagnetic coil and yoke is disposed at another location in the U-shaped inner cavity of the third electromagnetic sucker housing; the third isolation layer is filled in a space in the third electromagnetic sucker housing other than the third electromagnetic coil and yoke and the annular permanent magnet.

8. The rotary joint electromagnetic locking device according to claim 1, wherein the second electromagnetic sucker is a second permanent magnet type electromagnetic sucker, a center of the first electromagnetic sucker is provided with a central shaft hole, and the second permanent magnet type electromagnetic sucker is fixedly disposed in the central shaft hole of the first electromagnetic sucker; the second permanent magnet type electromagnetic sucker comprises a second permanent magnet type electromagnetic sucker assembly and a columnar permanent magnet; the columnar permanent magnet is provided with a second permanent magnet contact surface; the rotary plate is provided with a third contact surface at a corresponding position; when the second permanent magnet type electromagnetic sucker assembly has no adsorption force, under an adsorption force of the columnar permanent magnet, the third contact surface of the rotary plate is adsorbed to the second permanent magnet contact surface of the columnar permanent magnet; when the second permanent magnet type electromagnetic sucker assembly has an adsorption force, the adsorption force of the columnar permanent magnet is offset;

wherein the second permanent magnet type electromagnetic sucker assembly comprises a fourth electromagnetic sucker housing, a fourth electromagnetic coil and yoke, and a fourth isolation layer; the fourth electromagnetic sucker housing is provided with an inner cavity; the columnar permanent magnet is disposed at a position of the inner cavity of the fourth electromagnetic sucker housing adjacent to the rotary plate; the fourth electromagnetic coil and yoke is disposed at another position in the inner cavity of the fourth electromagnetic sucker housing; the fourth isolation layer is filled in a space in the fourth electromagnetic sucker housing other than the fourth electromagnetic coil and yoke and the columnar permanent magnet.

9. A rotary joint, comprising: a first joint connecting rod, a second joint connecting rod, and the rotary joint electromagnetic locking device according to claim 1, wherein the first joint connecting rod is coupled to the first electromagnetic sucker, and the second joint connecting rod is coupled to the rotary plate.

10. The rotary joint according to claim 9, wherein the rotary plate is provided with a plurality of connecting rod mounting holes that are spaced apart, and the rotary plate is connected to the second joint connecting rod through the plurality of the connecting rod mounting holes;

the first joint connecting rod has a stepped hollow shaft, the first electromagnetic sucker is fixedly connected to the first joint connecting rod through the stepped hollow shaft, the second joint connecting rod is hinged with the stepped hollow shaft of the first joint connecting rod through a bearing, and the first joint connecting rod and the second joint connecting rod are connected in a pretensioned way to an entire brake joint by a nut and a thread at an end of the stepped hollow shaft.

* * * * *